US007849005B2

(12) United States Patent
Ong

(10) Patent No.: US 7,849,005 B2
(45) Date of Patent: Dec. 7, 2010

(54) ELECTRONIC FUNDS TRANSFER METHOD

(76) Inventor: Yong Kin Ong, 5 Sellenger Court, City Beach WA 6015 (AU)

( * ) Notice: Subject to any disclaimer, the term of this patent is extended or adjusted under 35 U.S.C. 154(b) by 1374 days.

(21) Appl. No.: 10/203,736

(22) PCT Filed: Feb. 14, 2001

(86) PCT No.: PCT/AU01/00137

§ 371 (c)(1),
(2), (4) Date: Oct. 15, 2002

(87) PCT Pub. No.: WO01/59630

PCT Pub. Date: Aug. 16, 2001

(65) Prior Publication Data

US 2003/0055781 A1 Mar. 20, 2003

(30) Foreign Application Priority Data

Feb. 14, 2000 (AU) .................................. PQ5566

(51) Int. Cl.
*G06Q 40/00* (2006.01)
*G06Q 20/00* (2006.01)
(52) U.S. Cl. ........................... 705/39; 705/64; 705/65; 705/67; 705/75; 705/76
(58) Field of Classification Search .................. 705/39, 705/64, 65, 67, 75, 76
See application file for complete search history.

(56) References Cited

U.S. PATENT DOCUMENTS

| 671,279 | A | | 4/1901 | Jameson |
| 5,590,038 | A | | 12/1996 | Pitroda |
| 5,715,314 | A | * | 2/1998 | Payne et al. .................. 705/78 |
| 5,748,740 | A | | 5/1998 | Curry et al. |
| 5,822,737 | A | | 10/1998 | Ogram |
| 5,832,464 | A | | 11/1998 | Houvener et al. ............. 705/45 |

(Continued)

FOREIGN PATENT DOCUMENTS

AU PQ 556 2/2000

(Continued)

OTHER PUBLICATIONS

John Downes, Dictionary of finance and investment terms, 1995, Barron's, 4th Edition, pp. 126-127.*

(Continued)

*Primary Examiner*—Kirsten S Apple
*Assistant Examiner*—Scott S Trotter
(74) *Attorney, Agent, or Firm*—Ballard Spahr LLP

(57) ABSTRACT

A method of conducting an online transaction, said method including the steps of providing a transaction manager, registering a user with the transaction manager, registering a merchant with the transaction manager, the user requesting a unique transaction identifier from the transaction manager to cover the purchase, the transaction manager providing the user with a unique transaction identification, the user requesting the merchant for a transaction to purchase a product or service, the user providing the transaction identification to the merchant, the merchant providing the transaction identification to the transaction manager, the transaction manager validating the transaction identification, the transaction manager providing the merchant with a unique transaction number if the transaction identification is valid, and the transaction manager depositing payment into the merchant's financial institution account.

27 Claims, 5 Drawing Sheets

U.S. PATENT DOCUMENTS

| | | | |
|---|---|---|---|
| 5,883,810 A | 3/1999 | Franklin et al. | |
| 5,884,271 A | 3/1999 | Pitroda | |
| 5,987,132 A | 11/1999 | Rowney | |
| 5,991,738 A | 11/1999 | Ogram | |
| 6,000,832 A | 12/1999 | Franklin et al. | |
| 6,029,150 A | 2/2000 | Kravitz | |
| 6,149,055 A | 11/2000 | Gatto | |
| 6,163,771 A * | 12/2000 | Walker et al. | 705/18 |
| 6,317,729 B1 * | 11/2001 | Camp et al. | 705/79 |
| 6,324,526 B1 * | 11/2001 | D'Agostino | 705/44 |
| 6,327,578 B1 * | 12/2001 | Linehan | 705/65 |
| 6,332,134 B1 | 12/2001 | Foster | |
| 6,338,049 B1 * | 1/2002 | Walker et al. | 705/44 |
| 6,598,031 B1 | 7/2003 | Ice | |
| 6,925,439 B1 | 8/2005 | Pitroda | |
| 2001/0000535 A1 | 4/2001 | Lapsley et al. | |
| 2002/0198848 A1 | 12/2002 | Michener | |
| 2003/0061172 A1 | 3/2003 | Robinson | |
| 2004/0103060 A1 | 5/2004 | Foth et al. | |
| 2005/0246293 A1 | 11/2005 | Ong | |
| 2005/0247777 A1 | 11/2005 | Pitroda | |

FOREIGN PATENT DOCUMENTS

| | | |
|---|---|---|
| AU | PS0876 | 3/2002 |
| CA | 2 193 819 C | 1/1996 |
| CA | 2194015 | 12/2005 |
| CN | 1213915 | 4/1999 |
| CN | 0180670.5 | 2/2001 |
| CN | 200910126906.7 | 2/2001 |
| EP | 0370 2218 | 2/2003 |
| GB | 2 329 493 A | 3/1999 |
| GB | 2338381 | 12/1999 |
| IN | PCT/2002/00883/DEL | 2/2001 |
| MX | PA/A/2004-008599 | 2/2003 |
| SG | 200204740-5 | 2/2001 |
| SG | 200405955-6 | 2/2001 |
| WO | WO 98/22914 | 5/1998 |
| WO | WO 98/40809 | 9/1998 |
| WO | WO 99/57835 | 11/1999 |
| WO | WO 00/62259 | 10/2000 |
| WO | PCT/AU01/00137 | 2/2001 |
| WO | WO 01/13275 | 2/2001 |
| WO | PCT/AU2003/000255 | 2/2003 |
| WO | WO 03/075192 | 9/2003 |
| WO | WO 01/45008 | 6/2005 |

OTHER PUBLICATIONS

Application No. 2,399,608, Ong, Yong Kin (Michael), Filing Date Aug. 8, 2002, Office Acton, Date of Document Aug. 4, 2009.

U.S. Appl. No. 10/506,739 filed Apr. 14, 2005, Ong.

* cited by examiner

A diagrammatic view of ZIPFUND is illustrated in Figure 1 below:
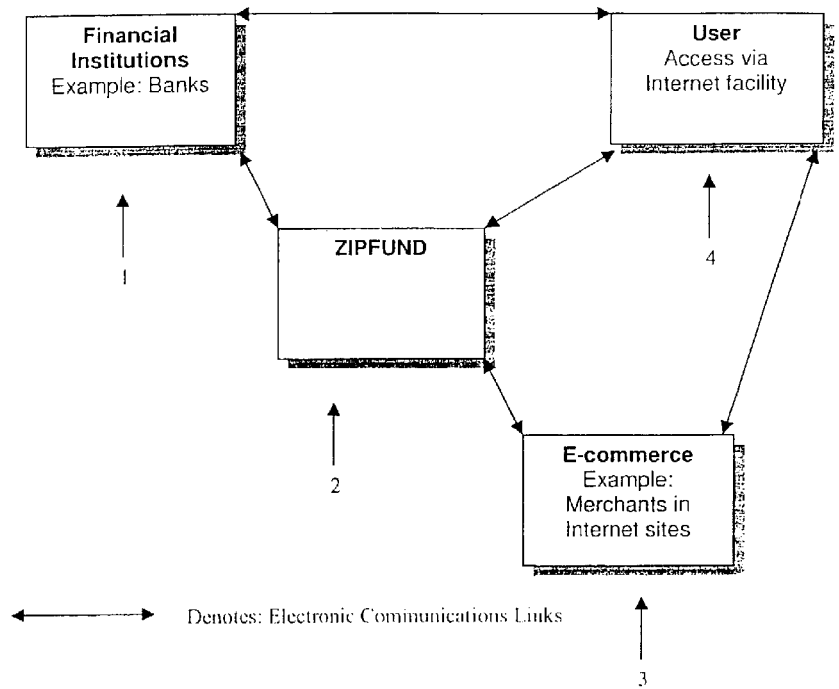

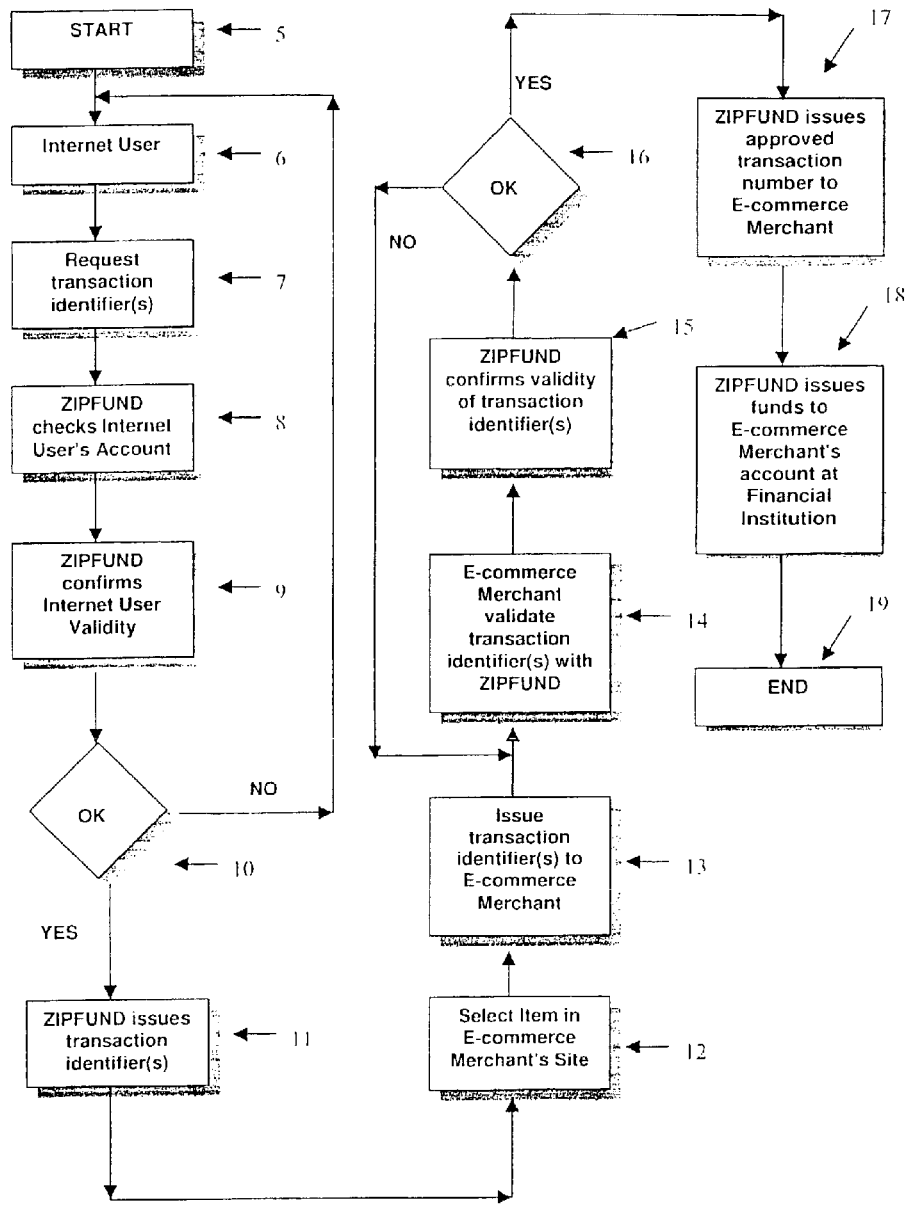
Figure 2: A diagrammatic view of the Transaction Process is shown below Figure 3: A block diagram of the system architecture is shown below.
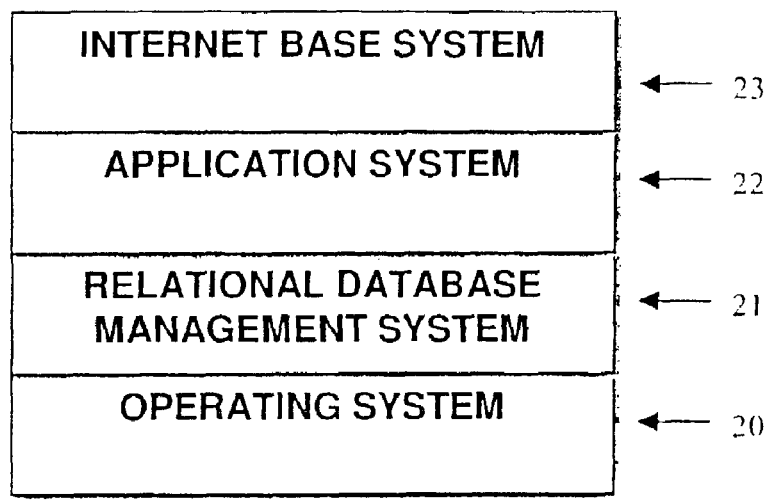

Figure 4: A block diagram of the database structure is shown below.
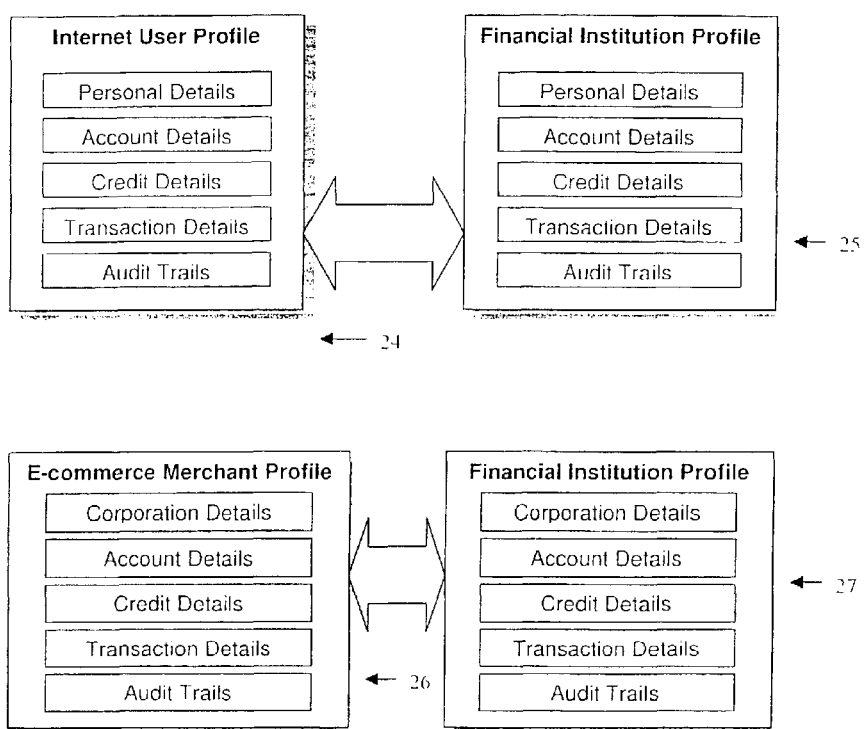

Figure 5: A block diagram of the data validation structure is shown below.
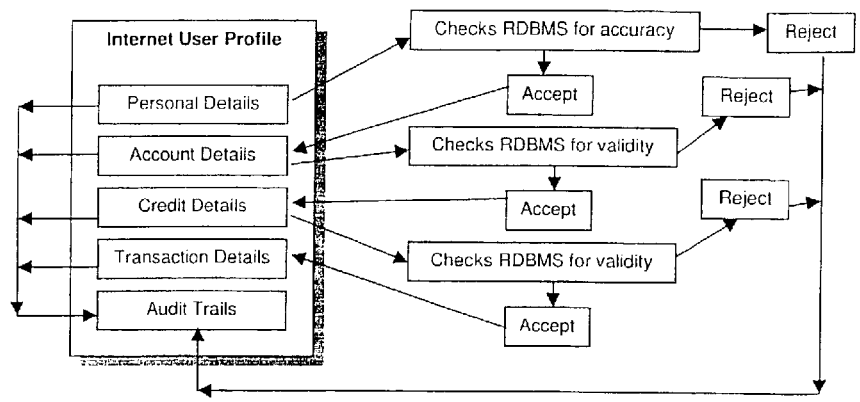
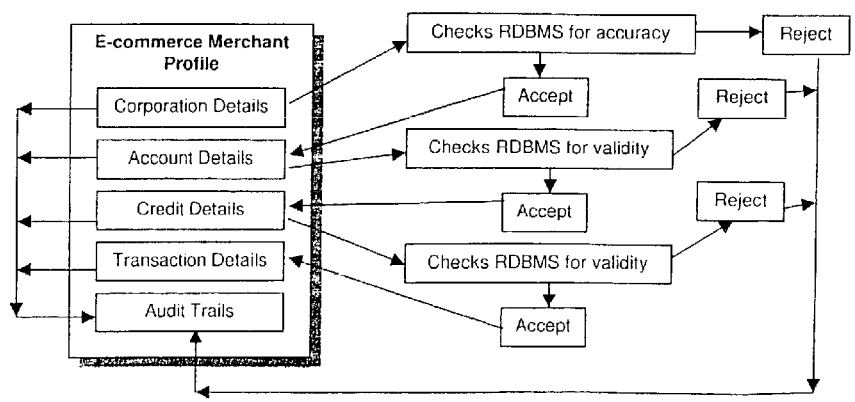

ELECTRONIC FUNDS TRANSFER METHOD

The present application is a 35 U.S.C. §371 national phase application from, and claims priority to, international application PCT/AU01/00137, filed Feb. 14, 2001 (published under PCT Article 21(2) in English), which claims priority to Australian patent application Serial No. PQ5566, filed Feb. 14, 2000 and now lapsed, which applications are incorporated herein in their entirety by reference.

FIELD OF THE INVENTION

The present invention relates an electronic funds transfer method for conducting an online purchase and a payment process.

BACKGROUND OF THE INVENTION

The present e-commerce environment and systems do not give people the confidence in shopping online. Consumers are concerned about security issues when using their credit cards/debit cards to make purchases. They are worried that by using their credit cards/debit cards to make purchases online, that it will compromise the security of their credit cards/debit cards and they will be vulnerable to fraud. Should credit card information go into the wrong hands, credit card owners may be liable for transactions not conducted by them.

The present invention provides a process that adds security to the transaction to alleviate some of the risks involved.

SUMMARY OF THE PRESENT INVENTION

In accordance with the present invention there is provided a method of conducting an online transaction, said method including the steps of
 providing a transaction manager;
 registering a user with the transaction manager;
 registering a merchant with the transaction manager;
 the user requesting a unique transaction identifier from the transaction manager to cover the purchase;
 the transaction manager checking the validity of the user;
 the transaction manager providing the user with a unique transaction identification if the user is valid;
 the user requesting the merchant for a transaction to purchase a product or service;
 the user providing the transaction identification to the merchant;
 the merchant providing the transaction identification to the transaction manager;
 the transaction manager validating the transaction identification;
 the transaction manager providing the merchant with a unique transaction number if the transaction identification is valid; and
 the transaction manager depositing payment into the merchant's financial institution account.

Preferably the transaction manager deducts money from a user's account to cover the money paid to the merchant. Preferably the transaction manager deducts money at the time of the request of the unique transaction identifier. Alternatively the transaction manager deducts money at the time of the transfer of money to the merchant.

Preferably the user's account is with a financial institution. Alternatively the user's account is with the transaction manger, the account may be a credit account or a charge account. Preferably the transaction manager issues a new account that corresponds to an existing account with a financial institution, whereby the new account details are used by the user and merchant in place old the existing account details. Preferably the transaction manager uses the new account details to look up the existing account details and the existing account details are used by the transaction manager with the financial institution.

Preferably the user requests the unique transaction identifier by an Internet connection. Preferably the user's registration details are stored in a database of the transaction manager. Preferably the merchant's registration details are stored in the database including a unique merchant identification.

Preferably the user's request for the unique transaction identifier is validated by checking the user's details stored in the database of the transaction manager. Preferably when the merchant forwards the unique identification number to the transfer manager, the merchants unique identifier is sent to the transaction manager, whereby validating the merchants identification is checked by the transaction manager before sending the identification number.

Preferably the transaction manager checks if sufficient funds are available to cover the transaction and the transaction number is only provided to the merchant if sufficient funds are available.

Preferably the merchant links to the transaction manager by the Internet or a dedicated secure line to request the transaction number and the transfer of funds. Preferably the link between the user and the transaction manager and merchant and transaction manager are secured by encryption.

DETAILED DESCRIPTION OF THE INVENTION

In order to provide a better understanding a preferred embodiment of the present invention will now be described in detail, by way of example only, with reference to the accompanying drawings, in which:

FIG. 1 is a diagrammatic view of the relationship between entities using the method of the present invention;

FIG. 2 is a diagrammatic flow chart representing a transaction process in accordance with the present invention;

FIG. 3 is a block diagram of a system architecture of the transaction manager of the present invention;

FIG. 4 is a block diagram of a database structure of the transaction manager; and FIG. 5 is a block diagram of a data validation process conducted by the transaction manager.

Referring to FIG. 1, entities using the method of the present invention are shown. A transaction manger 2 is provided. The transaction manager is referred to as ZIPFUND in the drawings. A user 4 uses the method of the present invention to conduct an electronic fund transfer transaction. Each user must have an account with the transaction manager to use the facility. The account is specific to each registered user. Information held by the transaction manager in relation to each user is held in confidence and in compliance with privacy laws. A user may maintain an Internet financial account with the transaction manager. The transaction manager will have the discretion to issue financial accounts to approved clients.

An e-commerce merchant 3 is a person or entity that uses an Internet site to do business with Internet clients. E-commerce merchants may register with the transaction manager to use the facility provided by the present invention. The registration process ensures that the e-commerce merchant site is a secure site and Internet clients are aware of this certification by the transaction manager. E-commerce merchants are required to obtain the transaction manager transaction identifiers from Internet clients prior to confirming payments. The transaction identifier needs to be confirmed by the transaction manager in order to secure payment from financial institution. The transaction manager will maintain a database of registered e-commerce merchants.

A financial institution, such as a bank 1, provides an approved level of funds that an Internet user has available. This may be, for example, a charge account or a credit card.

Each e-commerce merchant requires an account with a financial institution in order to receive payments. The transaction manager is responsible for all payments of transaction to a nominated financial institution of the e-commerce merchant.

Each financial institution may provide to the fund transfer manager access to a clients financial information including approved funds availability. This will enable the funds transfer manager to confirm an Internet user's financial standing. A financial account is issued to a customer on the basis of an understanding between the transfer manager and a financial institution.

The transfer manager is a trusted intermediatory that provides the services between Internet users, e-commerce merchants and financial institutions. In particular, the transaction manager is intermediatory that a user can trust to interact between the merchant and an electronic funds transfer system of a financial institution. The transfer manager provides e-commerce merchants with an approved transaction number in response to a transaction identifier sent to them via a secure network. The transfer manager provides to the financial institution an approved transaction number for each of the transaction identifiers sent by an e-commerce merchant via a secure network. Preferably the transaction manager uses a newly generated account number to replace the original credit card number and/or debit card number account for account transaction processing. This adds another level of security to the process.

The transfer manager is responsible for the security for Internet users carrying out their business to consumer transaction. This is possible through the use of proprietary software, accounting systems, design methodology, data definition and control processes.

Referring to FIG. 2 the processing of a transaction is shown. The process starts at 5. An Internet user 4 connects to the Internet at 6 and accesses the transaction manager 2 via the Internet. A user profile password check is conducted for granting access to the transfer manager. The transfer manager also has network security access controls and communication is encrypted. The Internet user is required to register to hold an account with the transfer manager.

The Internet user requests 7 a transaction identifier for his or her shopping needs. That is the user may request a transaction identifier be provided that will have a record of the limit the user allows to be authorised. This amount must be less than the available credit, but also put an additional limitation on the transaction that can be conducted using transaction identifier. This gives the user control over the maximum value of transaction that may be authorised. The transaction manager checks 8 the Internet user to ensure that he or she is a valid user. The transaction manager confirms the validation process at 9.

If, as a result of this decision at 10, the user is not valid then they are rejected from the transaction manager site. If the user is valid the transaction manager issues at 11 a transaction identifier.

The Internet user is then able to select an item at e-commerce merchants site at 12. Upon deciding to purchase the item the user provides the transaction identifier to the e-commerce merchant at 13.

The e-commerce merchant forwards for validation the transaction identifier to the transaction manager at 14. The transaction manager then confirms the validity of the transaction identifier at 15. A security process including a merchant profile password checking is conducted by the transaction manager before access is approved. Further network security access controls such as encryption are provided to prevent security problems.

If the transaction identifier is not valid at 16 the transaction rejected. If the identifier is rejected the e-commerce merchant is advised along with the reason for the rejection. If the transaction identifier is valid the transaction manager issues an approved transaction number at 17 to the e-commerce merchant and disables further use of the transaction identifiers. The forwarding of the transaction number to the merchant confirms that the transaction identifier was accepted. At 18 the transaction manager issues a credit to the e-commerce merchant's account with the financial institution according to the value of the purchase. The transfer manager undergoes a password check before access to the financial institution is approved. Further network security access controls are also provided including encryption of communication. The process then ends at 19.

In FIG. 3, the system architecture of the transaction manager is shown. An operating system 20 provides an underlayer of the transaction manager system architecture. Sitting on top of the operating system is a relational database management system 21. This is the data collection centre of the system. The relational database management system 21 interacts with an application system 22. The application system 22 interacts with a Internet base system 23 that links the transaction manager to the outside world.

Referring to FIG. 4, a database structure is shown relating an Internet user's profile to a financial institution and an e-commerce merchant's profile to a financial institution profile.

An Internet user's profile 24 is a repository of information concerning a particular Internet user. This is used for validation with a financial institution profile 25. An e-commerce merchant profile 26 or a repository of information concerning particular e-commerce merchant. This is used for validation with financial institution profile 27. Profiles for Internet user's will be different to those of e-commerce merchant profiles.

Referring to FIG. 5, data validation structure and processes are shown. In relation to the Internet user's profile personal details are checked with the relational database management system for accuracy and if accepted account details are then checked with the relational database management system validity. If accepted, credit details are checked with the relational database management system for validity and if accepted transaction details are stored. Audit trials of each check are also recorded.

In relation to the e-commerce merchant profile corporation details are checked with the relational database management system for accuracy. If accepted, account details are then checked with the relational database management system for validity. If accepted the credit details are checked with the relational database management system for validity. If accepted the transaction details are stored. An audit trail is recorded for each check and changed to the profile.

The present invention provides the following functionality to support e-commerce:
  it provides a true online system, that is a process where all transactions are online;
  it provides a purchasing system where all users are able to make purchases online;

it provides a payment system that supports other suppliers (merchant and/or financial institution) payment system;

the system provides password control to validate processes within the system;

it provides debit and credit card support enable usage of other suppliers (merchant and/or financial institution credit card/debit card as well as an alternative credit card/debit card facility to make purchases and payments);

it provides support for all financial institution accounts allowing a transaction to be processed by all types of bank accounts (for example, savings and cheques). Internet users can use all types of bank accounts to make online purchases and payments provided they are valid users;

it provides a controlled purchase amount through usage of transaction identifiers with all users able to control the amount of funds for each transaction;

it provides a user validation system with the system validating the users 5 identification;

it provides a merchant validation system with a system validating the merchants identification;

it provides protection system through encryption and decryption system and proprietary system architecture.

Modifications and variations may be made to the present invention without departing from the basic inventive concepts. The nature of such modifications and variations are to be determined within the scope of the present invention as defined by the foregoing description and appended claims.

The claims defining the invention are as follows:

1. A computer-implemented method of conducting an online transaction, said method comprising:

providing on a computer a transaction manager having a registration module for holding registration information of a user, and for holding registration information of a merchant; an input; a checking module; an identification generator; a validating module; a transaction number generator module; an output; and a payment module;

registering a user with the transaction manager by storing registration information of the user in the registration module;

registering a merchant with the transaction manager by storing registration information of the merchant in the registration module;

receiving at the input of the transaction manager a request by the user for a unique transaction identifier to cover a purchase;

checking the validity of the user using the checking module;

outputting to the user a unique identification of a transaction generated by the identification generator from the output if the user is valid;

the user sending from a user computer to a computer associated with the merchant a request for a transaction to purchase a product or service, the request comprising the transaction identification and a user nominated account identifier;

receiving at the input of the transaction manager the transaction identification and the user nominated account identifier provided by the merchant computer;

confirming payment of the transaction in respect of a registered user's financial institution account identified by the user nominated account identifier comprising validating the received transaction identification using the validating module, then outputting from the output to the merchant a unique transaction number generated by the transaction number generator module if the transaction identification is valid; and causing an online payment to be made by an external financial institution deducting the payment from the user's financial institution account identified by the account identifier and depositing the payment into the merchant's financial institution account using the payment module when the received transaction identification is validated.

2. A method of conducting an online transaction as claimed in claim 1, wherein the transaction manager deducts money from a user's account to cover the money paid to the merchant.

3. A method of conducting an online transaction as claimed in claim 2, wherein the transaction manager deducts money at the time of the request of the unique transaction identifier.

4. A method of conducting an online transaction as claimed in claim 2, wherein the transaction manager deducts money at the time of the transfer of money to the merchant.

5. A method of conducting an online transaction as claimed in claim 1, wherein the user's account is with a financial institution.

6. A method of conducting an online as claimed in claim 1, wherein the user's account is with the transaction-manager and the transaction manager is not a financial institution.

7. A method of conducting an online transaction as claimed in claim 1, wherein the transaction manager issues a new account from an account issue module, where the new account that corresponds to an existing account with a financial institution, whereby the new account details are used by the user and merchant in place of the existing account details.

8. A method of conducting an online transaction as claimed in claim 7, wherein the transaction manager uses the new account details to look up the existing account details in a database and the existing account details are used by the transaction manager to conduct the financial institution to deduct money to cover the purchase from the user's existing account.

9. A method of conducting an online transaction as claimed in claim 1, wherein the user requests the unique transaction identifier by an Internet connection.

10. A method of conducting an online transaction as claimed in claim 1, wherein the user's registration details are stored in a database of the transaction manager.

11. A method of conducting an online transaction as claimed in claim 10, wherein the merchant's registration details are stored in the database including a unique merchant identification.

12. A method of conducting an online transaction as claimed in claim 10, wherein the user's request for the unique transaction identifier is validated by the checking module checking the user's details stored in the database of the transaction manager.

13. A method of conducting an online as claimed in claim 11, wherein when the merchant forwards the unique identification number to the transaction manager, the merchant's unique identifier is sent to the transaction manager, whereby validating the merchant's identification is checked by the validating module of the transaction manager before sending the transaction number to the merchant.

14. A method of conducting an online as claimed in claim 1, wherein the transaction manager checks if sufficient funds are available to cover the transaction and the transaction number is only provided to the merchant if sufficient funds are available.

15. A method of conducting an online transaction as claimed in claim 1, wherein the merchant links to the transaction manager by the Internet or a dedicated secure line to request the transaction number and the transfer of funds.

16. A method of conducting an online transaction as claimed in claim 1, wherein the link between the user and the transaction manager and merchant and transaction manager are secured by encryption performed by an encryptor module.

17. A computer implemented transaction manager for conducting an online transaction, said transaction manager comprising:

a computer, wherein said computer is configured to execute computer-executable code comprising:

a registration module for registering a user;

a merchant registration module for registering a merchant;

a user request input module for receiving a user request for a unique transaction identifier to cover a purchase;

a checking module for checking the validity of the user;

an identification generator that generates an unique transaction identification if the user is valid;

a transaction identification generator that generates a unique transaction identification;

a transaction identification input module for receiving the transaction identification and a user nominated account identifier after they have been provided by the user to the merchant as part of a request to purchase a product service;

a validating module for confirming the payment of the transaction in respect of a registered user's financial institution account identified by the user nominated account identifier comprising validating the received transaction identification;

a transaction number output module for providing the merchant with the unique transaction number only if the transaction identification has been validated and is valid; and a payment module for causing payment to be made by an external financial institution deducting the payment from the user's financial institution account identified by the nominated account identifier and depositing the payment into the merchant's financial institution account when the received transaction identification is validated.

18. The transaction manager of claim 17, wherein the transaction manager further comprises module for deducting money from a user's account to cover the money paid to the merchant.

19. The transaction manager of claim 17, wherein the transaction manager comprises module for issuing a new account that corresponds to an existing account with a financial institution, whereby the new account details are used by the user and merchant in place of the existing account details.

20. The transaction manager of claim 19, wherein the transaction manager is configured to use the new account details to look up the existing account details and the existing account details are used by the transaction manager with the financial institution.

21. The transaction manager of claim 17, wherein the user request input module is configured to receive the request for the unique transaction identifier by an Internet connection.

22. The transaction manager of claim 17, wherein the registration module of the transaction manager comprises a database storage for storing the user registration details.

23. The method of claim 22, wherein database storage is also for storing the merchant's registration details including a unique merchant identification.

24. The transaction manager of claim 22, wherein transaction manager is configured to validate the user's request for the unique transaction identifier by checking the user's details stored in the database storage.

25. The transaction manager of claim 17, wherein the transaction manager is configured to check if sufficient funds are available to cover the transaction and the transaction number is only provided to the merchant if sufficient funds are available.

26. The transaction manager according to claim 17, wherein transaction identification output module is configured to provide the unique transaction identification to the user by a secure encrypted link.

27. The transaction manager of claim 17, wherein transaction identification input module is configured to receive the unique transaction identification by a secure encrypted link.

* * * * *